United States Patent
Fay et al.

(10) Patent No.: US 12,131,551 B2
(45) Date of Patent: Oct. 29, 2024

(54) SYSTEMS AND METHODS FOR MITIGATING MIS-DETECTIONS OF TRACKED OBJECTS IN THE SURROUNDING ENVIRONMENT OF A VEHICLE

(71) Applicant: Rivian IP Holdings, LLC, Irvine, CA (US)

(72) Inventors: Gary Fay, Hermosa Beach, CA (US); Krishna Prasad Varadarajan Srinivasan, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 505 days.

(21) Appl. No.: 17/567,023

(22) Filed: Dec. 31, 2021

(65) Prior Publication Data

US 2023/0215184 A1   Jul. 6, 2023

(51) Int. Cl.
| | |
|---|---|
| *G06V 20/58* | (2022.01) |
| *B60W 40/105* | (2012.01) |
| *G06T 7/20* | (2017.01) |
| *G06T 7/70* | (2017.01) |
| *G06V 10/25* | (2022.01) |
| *G06V 10/74* | (2022.01) |

(52) U.S. Cl.
CPC ........... *G06V 20/58* (2022.01); *B60W 40/105* (2013.01); *G06T 7/20* (2013.01); *G06T 7/70* (2017.01); *G06V 10/25* (2022.01); *G06V 10/761* (2022.01); *B60W 2554/80* (2020.02); *G06T 2207/20081* (2013.01); *G06T 2207/30252* (2013.01); *G06T 2210/12* (2013.01)

(58) Field of Classification Search
CPC .......... G06T 7/70; G06T 7/20; G06T 2207/20081; G06T 2207/30252; G06T 2210/12; G06V 10/25; G06V 10/761; B60W 40/105; B60W 2554/80
USPC ......................................... 382/103
See application file for complete search history.

(56) References Cited

U.S. PATENT DOCUMENTS

| | | | |
|---|---|---|---|
| 2016/0117560 A1* | 4/2016 | Levi ........................ | G06V 20/58 348/148 |
| 2020/0210726 A1* | 7/2020 | Yang ...................... | G01S 13/006 |

(Continued)

OTHER PUBLICATIONS

U.S. Appl. No. 17/384,510 "Systems and Methods for Determining Drivable Space", filed on Jul. 23, 2021, 16 Pages.

*Primary Examiner* — Gabriel I Garcia
(74) *Attorney, Agent, or Firm* — Haley Guiliano LLP

(57) ABSTRACT

Systems and methods are provided to receive, at a processor associated with a vehicle and via one or more image sensors associated with the vehicle, image data associated with an environment surrounding the vehicle and corresponding to a first image captured at a first time, and additional image data associated with an environment surrounding the vehicle and corresponding to a second image captured by at a second time. The provided systems and methods may determine, based on the received additional image data and a machine learning model, that a tracked object identified in the first image is not detected in the second image, and may determine, based on vehicle data and tracking data of the tracked object, that the tracked object should be present in the second image and perform a remedial action on the additional image data to identify the tracked object in the second image.

20 Claims, 6 Drawing Sheets

(56) References Cited

U.S. PATENT DOCUMENTS

| | | | |
|---|---|---|---|
| 2020/0272148 A1* | 8/2020 | Karasev | G01S 13/726 |
| 2021/0209797 A1* | 7/2021 | Lee | G06T 17/00 |
| 2021/0326610 A1* | 10/2021 | Musk | G06V 10/803 |
| 2022/0284712 A1* | 9/2022 | Musk | G06V 20/58 |
| 2022/0327323 A1 | 10/2022 | Deshmukh et al. | |

* cited by examiner

SYSTEMS AND METHODS FOR MITIGATING MIS-DETECTIONS OF TRACKED OBJECTS IN THE SURROUNDING ENVIRONMENT OF A VEHICLE

INTRODUCTION

In autonomous and semi-autonomous vehicles, it can be useful for the vehicle to determine if there is an object near the vehicle, and a distance between such object and the vehicle. In one approach, neural network machine learning models may be employed in detecting objects surrounding a vehicle. However, there is a need for reducing false negatives and miss-detections of objects by the neural network.

SUMMARY

Accordingly, systems and methods are disclosed herein comprising processing circuitry configured to receive, at a processor associated with a vehicle and via one or more image sensors associated with the vehicle, image data associated with an environment surrounding the vehicle, wherein the image data corresponds to a first image captured by the one or more image sensors at a first time, and receive, at the processor and via the one or more image sensors, additional image data associated with an environment surrounding the vehicle, wherein the additional image data corresponds to a second image captured by the one or more image sensors at a second time after the first time. The processing circuitry may determine, based on the received additional image data and a machine learning model, that a tracked object identified in the first image is not detected in the second image. The provided systems and methods may further determine, based on vehicle data and tracking data of the tracked object, that the tracked object should be present in the image, and perform a remedial action on the additional image data to identify the object in the second image.

In some embodiments, the processing circuitry is configured to determine, based on the received additional image data and the machine learning model, that the tracked object identified in the first image is not detected in the second image, by inputting the image data into the machine learning model, and the machine learning model outputs a first output based on the inputted image data. In addition, the additional image data may be input into the machine learning model, and the machine learning model outputs a second output based on the inputted additional image data, and the provided systems and methods may determine, based on the second output of the machine learning model, that the second image does not comprise a depiction of the tracked object.

In some embodiments, the vehicle data comprises a speed of the vehicle, the tracking data comprises a first distance between the vehicle and the tracked object, and the processing circuitry is configured to determine, based on the vehicle data and the tracking data of the tracked object, that the tracked object should be present in the second image by determining, based on the first output of the machine learning model, that the tracked object is located at the first distance from the vehicle at the first time, and determining, based on the first distance and the speed of the vehicle, that the second output should have indicated that the tracked object is depicted in the second image.

In some embodiments, the first output comprises a bounding box associated with a location of the tracked object in the first image, and the processing circuitry is configured to perform the remedial action on the additional image data to identify the tracked object in the second image by determining, based on the bounding box, the first distance, and the speed of the vehicle, a region of interest associated with a predicted location of the tracked object in the second image.

In some embodiments, the processing circuitry is further configured to perform the remedial action on the additional image data to identify the tracked object in the second image by performing computer vision convolution within the region of interest to identify the tracked object in the second image, and determine, based on the computer vision convolution, that the tracked object is located at a second distance from the vehicle at the second time.

In some embodiments, the machine learning model is associated with a threshold confidence level for identifying objects in image data inputted to the machine learning model, and the processing circuitry is configured to perform the remedial action on the additional image data to identify the tracked object in the second image by reducing the threshold confidence level for a portion of the second image associated with the region of interest.

In some embodiments, the processing circuitry is configured to perform the remedial action on the additional image data to identify the tracked object in the second image by feeding back the additional image data to the machine learning model associated with the reduced threshold confidence level for the portion of the second image associated with the region of interest; and determining, based on a third output of the machine learning model received in response to feeding back the additional image data to the machine learning model, that the tracked object is located at a second distance from the vehicle at the second time.

In some embodiments, the vehicle is a first vehicle, the environment surrounding the vehicle is defined by a predetermined distance from the sensor of the first vehicle, and the tracked object is a second vehicle within the predetermined distance.

A non-transitory computer-readable medium is disclosed herein having non-transitory computer-readable instructions encoded thereon that, when executed by a processor associated with a vehicle, causes the processor to receive, via one or more image sensors associated with the vehicle, image data associated with an environment surrounding the vehicle, wherein the image data corresponds to a first image captured by the one or more image sensors at a first time, and receive, via the one or more image sensors, additional image data associated with an environment surrounding the vehicle, wherein the additional image data corresponds to a second image captured by the one or more image sensors at a second time after the first time. The processor may be further caused, by execution of the instructions, to determine, based on the received additional image data and a machine learning model, that a tracked object is not detected in the image, and determine, based on vehicle data and tracking data of the tracked object, that the tracked object should be present in the second image, and perform a remedial action to identify the tracked object in the second image.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
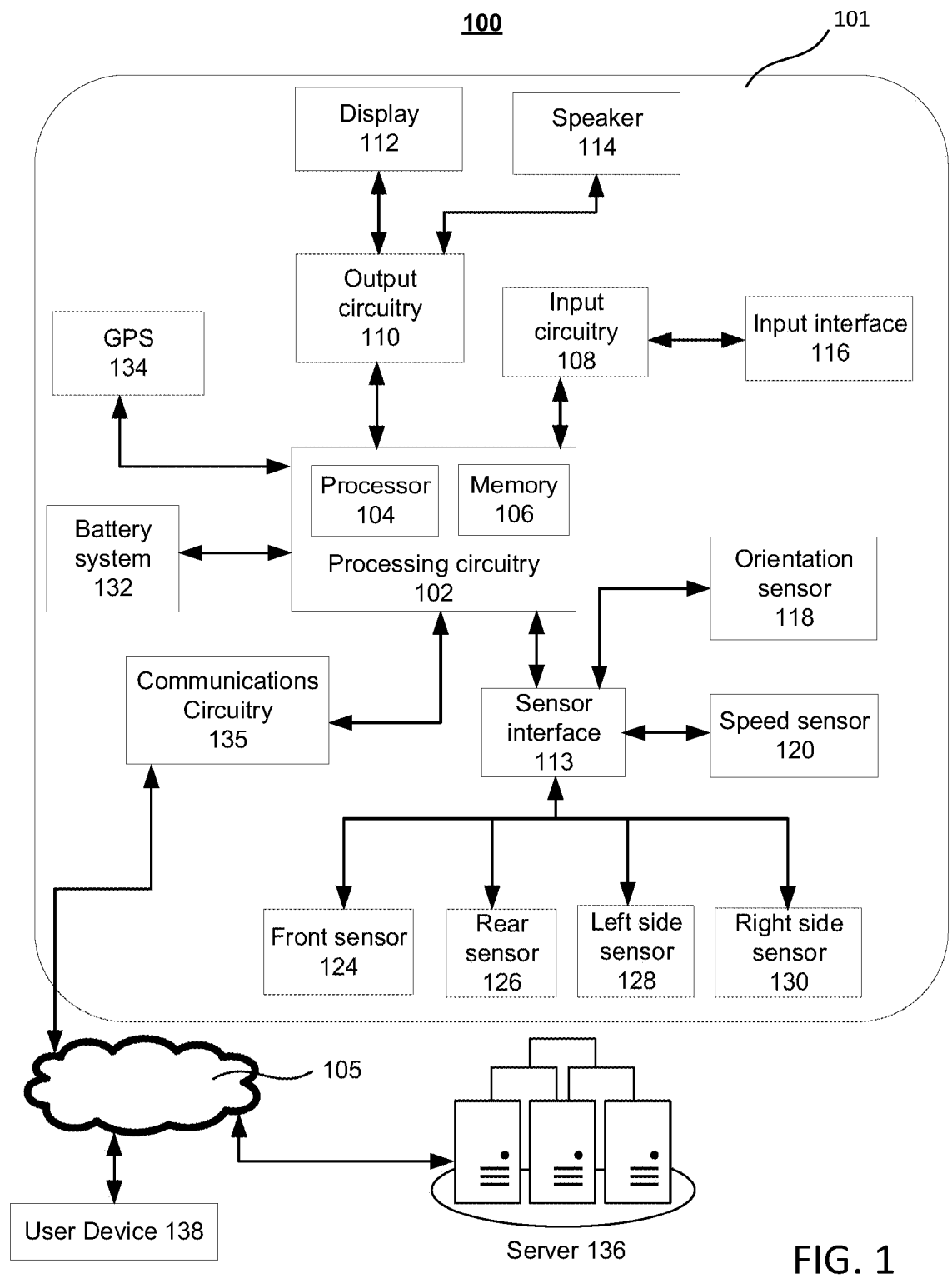
FIG. 1 shows a block diagram of components of a system configured to perform a remedial action to identify an object in an image, in accordance with some embodiments of the present disclosure.

FIG. 1 shows a block diagram of components of a system 100 configured to perform a remedial action to identify an object in an image, in accordance with some embodiments of the present disclosure. System 100 may comprise vehicle 101, which may be in communication with server 136 and user device 138 via one or more networks 105. Vehicle 101 may be a car (e.g., a coupe, a sedan, a truck, an SUV, a bus), a motorcycle, an aircraft (e.g., a drone), a watercraft (e.g., a boat), or any other type of vehicle. In some embodiments, vehicle 101 may be configured to operate autonomously or semi-autonomously.

Vehicle 101 may comprise processing circuitry 102 which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to input interface 116 (e.g., a steering wheel, a touch screen display, buttons, knobs, a microphone or other audio capture device, etc.) via input circuitry 108. In some embodiments, a driver of vehicle 101 may be permitted to select certain settings in connection with the operation of vehicle 101 (e.g., to indicate whether vehicle 101 should operate autonomously). In some embodiments, processing circuitry 102 (and/or processing circuitry of one or more servers 136) may be configured to train and/or utilize a machine learning model to detect a tracked object, in an environment surrounding vehicle 101, in an image (e.g., captured up one or more of sensors 124, 126, 128, 130) and perform a remedial action to identify an object in the image based on determining that the tracked object is not detected in the image.

In some embodiments, processing circuitry 102 may be communicatively connected to GPS system 134 or other positioning device of vehicle 101, where the driver may interact with the GPS system via input interface 116. GPS system 134 may be in communication with multiple satellites and/or servers 136 remote from vehicle 101 to ascertain the driver's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 may use the determined location to identify whether vehicle 101 is within a threshold range of a tagged location.

Processing circuitry 102 may be communicatively connected to display 112 and speaker 114 by way of output circuitry 110. Display 112 may be located at a dashboard of vehicle 101 and/or a heads-up display at a windshield of vehicle 101. For example, an interface for GPS system 134 or an interface of an infotainment system may be generated for display, and display 112 may comprise an LCD display, an OLED display, an LED display, or any other type of display. Speaker 114 may be located at any location within the cabin of vehicle 101, e.g., at the dashboard of vehicle 101, on an interior portion of the vehicle door, etc.

Processing circuitry 102 may be communicatively connected (e.g., by way of sensor interface 113) to sensors (e.g., front sensor 124, rear sensor 126, left side sensor 128, right side sensor 130, orientation sensor 118, speed sensor 120). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Front sensor 124, rear sensor 126, left side sensor 128, and/or right side sensor 130 may be positioned at a variety of locations of vehicle 101, and may be one or more of a variety of types, e.g., an image sensor, an ultrasonic sensor, a radar sensor, LED sensor, LIDAR sensor, etc., configured to measure the distance between vehicle 101 and an object in a surrounding environment of the vehicle (e.g., by outputting a light or radio wave signal, and measuring a time for a return signal to be detected and/or an intensity of the returned signal, and/or performing image processing on images captured by the image sensor of the surrounding environment of vehicle 101). In some embodiments, processing circuitry 102 may take into account the acceleration of vehicle 101, e.g., based on sensor data generated by orientation sensor 118, when determining a predicted distance between vehicle 101 and an object.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle.

In some embodiments, communications circuitry 135 (e.g., comprising a network transceiver) and/or user device 138 (e.g., a mobile device) may be in communication with one or more servers 136 (e.g., over a communications network 105 such as, for example, the Internet), which may be configured to perform any suitable portions of the processing described above and below. Server 136 may comprise a plurality of servers configured to remotely provide cloud computing resources (e.g., storage, processing, software applications, etc.) to other components of system 100, e.g., user device 138 and/or vehicle 101. In some embodiments, server 136 may be associated with a manufacturer of vehicle 101. The elements of system 100 may be configured to communicate over any suitable wireless (or wired) communication path. For example, user device 138 may be configured to communicate with vehicle 101 using a short-range radio communication technique, such as, for example, Bluetooth low energy (BLE) or near-field communication (NFC), and user device 138 and vehicle 101 may communicate with server 136 over network 105, e.g., the Internet, a local area network, a wide area network, a satellite network, a cellular network, etc. In some embodiments, server 136 may comprise one or more processors configured to perform processing-intensive tasks to aid vehicle 101 in autonomous or semi-autonomous navigation.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

Figure 2:
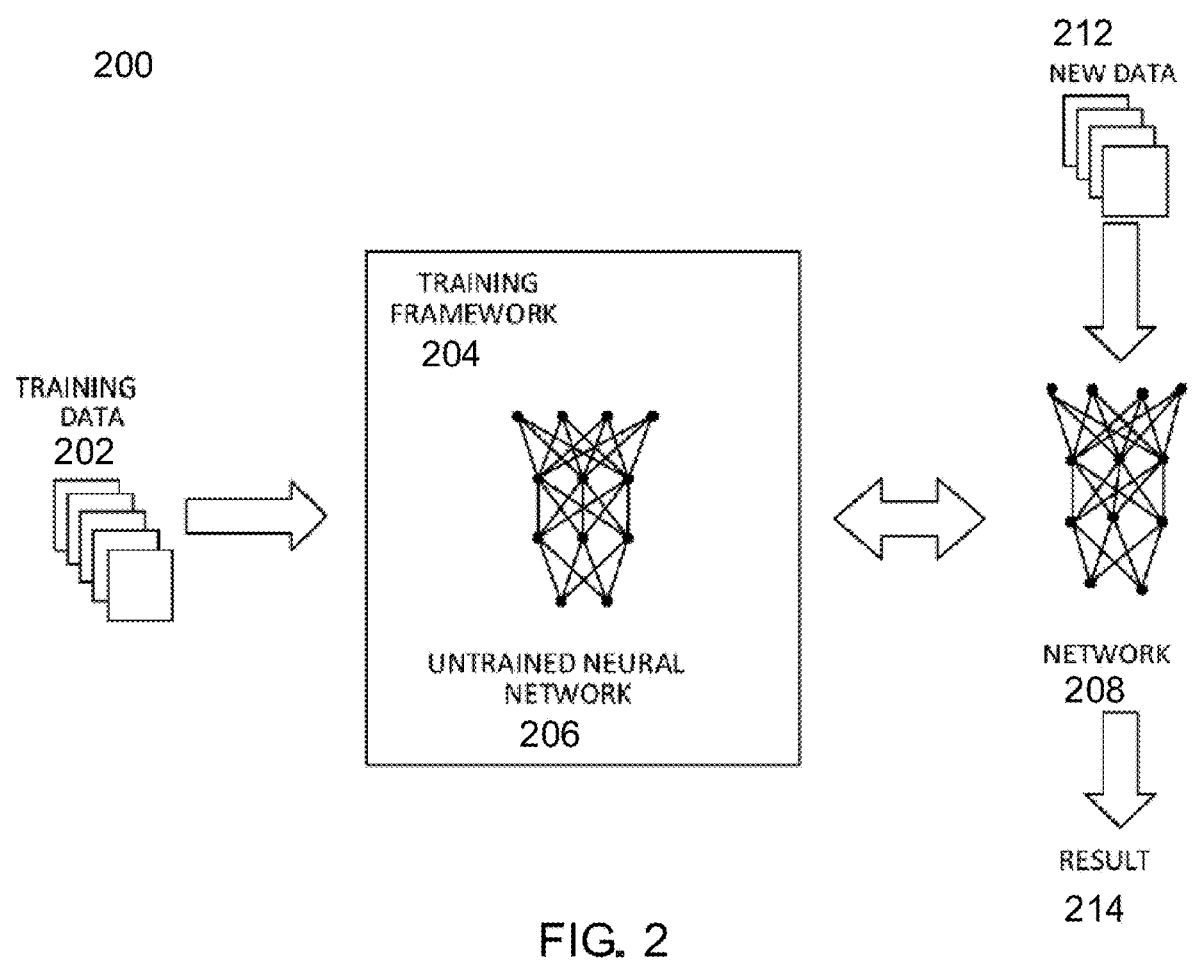
FIG. 2 shows an illustrative machine learning model for detecting an object in an image, in accordance with some embodiments of the present disclosure.

FIG. 2 shows an illustrative machine learning model for detecting an object in an image, in accordance with some embodiments of the present disclosure. Machine learning model 208 may be, e.g., a convolutional neural network (CNN), or any other suitable machine learning model trained to accept as input image 212 of a surrounding environment of vehicle 101, and output a determination result 214 of a location and/or a classification of a type or class of object depicted in image 212. Training data 202 may comprise images of an environment surrounding vehicles and having been assigned labels. For example, each training image may be associated with a vector of any suitable number of dimensions encoding information specifying whether one or more objects are present in the training image, and if so, specifying a class or type of the object (e.g., car, pedestrian, motorcycle, animal, train, bicycle, road signs, terrain, background, etc.) and specifying parameters (e.g., x-coordinate, y-coordinate, midpoint, height, width) of a bounding box surrounding a perimeter of the object, and/or indicating a distance from vehicle to object annotation. Training framework 204 may train the untrained machine learning model 206 using processing resources described herein, to generate a trained machine learning model 208. In some embodiments, initial weights may be chosen randomly or by pre-training using a deep belief network. Training may be performed in either a supervised, partially supervised, or unsupervised manner.

Machine learning model 208 may be trained to output a probability of whether inputted image data (e.g., an inputted image 212) contains an object and a prediction of one or more parameters (e.g., a location and coordinates) of a bounding box surrounding the object. In some embodiments, object predictions associated with a probability below a certain threshold (e.g., 0.4) may be discarded. In some embodiments, inputted image data (e.g., image 212) may be divided into cells or regions according to a grid (e.g., forming an array of regions that in aggregate constitute the image), and analysis may be performed on each region of the image to output a prediction of whether an object is present and predicted bounding box coordinates within a particular region. For example, a filter or kernel of any suitable size (e.g., 3×3 pixels) may be overlaid on each region of the image, to perform a convolution, e.g., multiplying together each overlapping pixel, and adding each product together, and inputted to the machine learning model in outputting predictions.

In some embodiments, (e.g., such as if a regression classifier is used) untrained machine learning model 206 may be trained using supervised learning, wherein training dataset 202 includes an input paired with a desired output, or where training dataset 202 includes input having known output and outputs of neural networks are manually graded. In some embodiments, untrained machine learning model 206 may be trained in a supervised manner. Training framework 204 may process inputs from training dataset 202 and compare resulting outputs against a set of expected or desired outputs. In some embodiments, errors may then be propagated back through untrained machine learning model 206. Training framework 204 may adjust weights that control untrained machine learning model 206. Training framework 204 may include tools to monitor how well untrained machine learning model 206 is converging towards a model, such as trained machine learning model 208, suitable for generating correct answers, such as in result 214, based on known input data, such as new data 212. In some embodiments, training framework 204 trains untrained neural network 206 repeatedly while adjusting weights to refine an output of untrained neural network 206 using a loss function and adjustment process, such as stochastic gradient descent. In some embodiments, training framework 204 trains untrained machine learning model 206 until untrained neural network 206 achieves a desired accuracy. Trained machine learning model 208 can then be deployed to implement any number of machine learning operations. In some embodiments, the machine learning model may be trained to classify pixels of inputted image data into drivable and non-drivable space, for applications such as autonomous navigation.

In some embodiments, untrained machine learning model 206 may be trained using unsupervised learning, wherein untrained machine learning model 206 attempts to train itself using unlabeled data. In some embodiments, unsupervised learning training dataset 202 may include input data without any associated output data or "ground truth" data. Untrained machine learning model 206 can learn groupings within training dataset 202 and can determine how individual inputs are related to untrained dataset 202. In some embodiments, unsupervised training can be used to generate a self-organizing map, which is a type of trained machine learning model 208 capable of performing operations useful in reducing dimensionality of new data 212. Unsupervised training can also be used to perform anomaly detection, which allows identification of data points in a new dataset 212 that deviate from normal or existing patterns of new dataset 212. In some embodiments, semi-supervised learning may be used, which is a technique in which training dataset 202 includes a mix of labeled and unlabeled data. Training framework 204 may thus be used to perform incremental learning, such as through transferred learning techniques. Such incremental learning may enable trained machine learning model 208 to adapt to new data 212 without forgetting knowledge instilled within the network during initial training.

In some embodiments, model 208 may be configured to employ a softmax layer (e.g. to obtain a normalized probability distribution), such as among multiple probabilities output by the model in connection with one or more of a category or class of the object, whether an object is present, and a location of a bounding box. In some embodiments, model 208 may be configured to apply an argmax function to such probabilities (e.g., to set each probability to zero or one).

Figure 3:
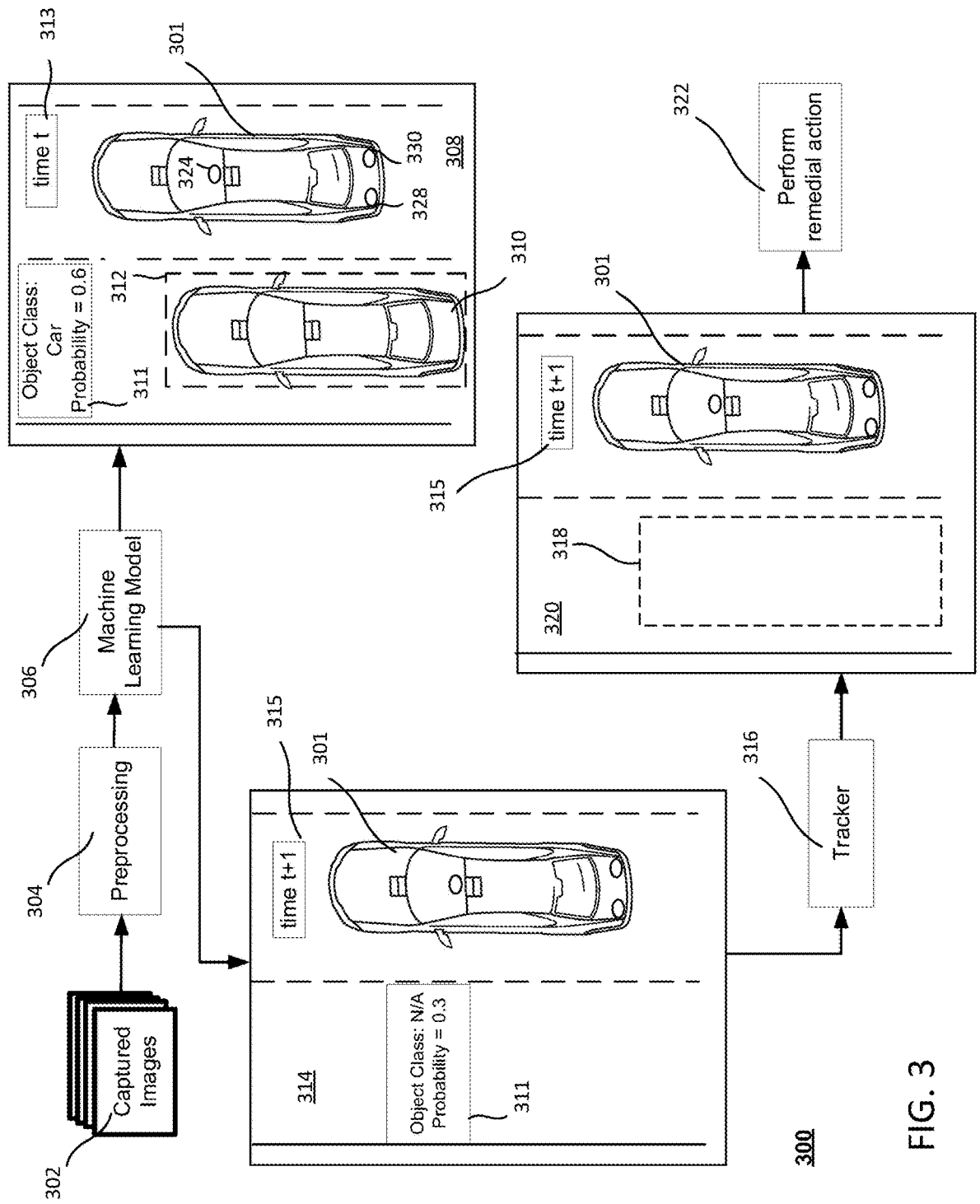
FIG. 3 shows a block diagram of components of a system configured to perform a remedial action to identify an object in an image, in accordance with some embodiments of the present disclosure.

FIG. 3 shows a block diagram of components of a system 300 configured to perform a remedial action to identify an object in an image, in accordance with some embodiments of the present disclosure. Image data comprising one or more images of an environment surrounding vehicle 301 may be captured at 302 by, e.g., image sensors 324, 328, and/or 330 (each of which may correspond to one of sensors 124, 126, 128, 130 of FIG. 1) of vehicle 301 (which may correspond to vehicle 101 of FIG. 1). Such image sensors may be mounted or positioned at any suitable portion of vehicle 301 in order to facilitate capturing images of the entire region or environment (or any suitable portions thereof) around vehicle 301, while vehicle 101 is stationary or in motion. For example, one or more image sensors 324, 328, 330 may be disposed at one or more of a variety of locations on an exterior of, and/or an interior of, vehicle 301, e.g., sensor 324 may be disposed at a windshield of vehicle 301, at a front bumper of vehicle 301, a roof of vehicle 301, and sensors 324, 328, and 330 may be located at a rear bumper of vehicle 301, a roof of vehicle 301, a windshield of vehicle 301, respective side view mirrors of vehicle 301, or any combination thereof. A series of images may be captured by image sensors 324, 328, and/or 330, including any suitable number of images. In some embodiments, images may be captured repeatedly, e.g., at a predetermined frequency, to capture the surrounding environment of vehicle 301 over time.

At 304, processing circuitry 102 of vehicle 101 (and/or processing circuitry of server 136) may be configured to perform preprocessing e.g., to extract suitable features from captured images 302, and/or convert identified features of captured images 302 into a vector or matrix representation, and/or match formatting of the captured images to formatting of training data 202, normalization, resizing, minimization, etc. In some embodiments, preprocessing may comprise brightening the image or portions thereof, darkening the image or portions thereof, color shifting the image (e.g., among color schemes, from color to grayscale, or other mapping), cropping the image, scaling the image, adjusting an aspect ratio of the image, adjusting contrast of an image, performing any other suitable processing to prepare the image, or any combination thereof.

At 306, processing circuitry 102 of vehicle 101 (and/or processing circuitry of server 136) may cause the captured images 302 (and/or extracted features thereof during preprocessing 304) to be inputted to machine learning model 306 (which may correspond to trained machine learning model 208). Machine learning model 306 may output (at 308), based on image data comprising or corresponding to one or more input images (e.g., including a first image, and received by processor 104 of vehicle 101 and/or machine learning model 306 from one or more of image sensors 324, 328, 330 at a first time 313), an indication at 311 of a class of identified object 310 (e.g., a car) and a probability (e.g., confidence score) associated with the presence of object 310 in the captured images and/or detected class of objects, as well as parameters of bounding box 312. Vehicle 301 may be travelling on a road, e.g., a highway or a local road, or off-road. It should be appreciated that the system 300 can be implemented with any type of vehicle on any type of terrain. In some embodiments, a notification associated with output 308 may be provided to the user (e.g., to generate for display, at display 112, a representation of object 310 to depict a location in real-time of object 310 with respect to vehicle 301). In some embodiments, certain actions may be suggested or automatically performed on the basis of the output 308 of machine learning model 306 at first time 313, e.g., to provide certain warning indications or suggested navigation routes related to the location of object 310, to perform autonomous driving on the basis of the location of object 310, etc.

The output of machine learning model 306 may be configured to specify and/or draw 2D predicted parameters of bounding shapes (e.g., bounding boxes, bounding polygons, bounding triangles, bounding ellipses, bounding circles, etc.) around candidate objects (e.g., vehicles, humans, animals, or other obstacles) positioned in front of, behind, or to a side of vehicle 301. In some embodiments, the plurality of images captured by the sensors 324, 328, 330 of the surrounding environment of vehicle 101 may be inputted to machine learning model 306 in, e.g., a first-in, first-out manner. In some embodiments, machine learning model 306 may be a neural network (e.g., a CNN) and/or implemented as a classification algorithm (e.g., a Naïve Bayes algorithm, a Support Vector Machine, a logistic regression, linear regression, random forest, a nearest neighbor algorithm, and/or any other suitable classifier). Classifiers are discussed in more detail in connection with commonly owned U.S. application Ser. No. 17/225,518 filed Apr. 8, 2021, the entire contents of which are hereby incorporated by reference herein in their entirety.

Calculation of a bounding box or other bounding mechanism may be performed in any suitable manner, such as by known computer vision-based methods and processes for identifying an object and fitting a box to its outer edges. For example, objects and their outer boundaries may be identified and located within an image using any methods such as edge detection methods, feature searching methods, probabilistic object models, graph matching, histograms of oriented gradients (HOGs) fed into classifiers such as support vector machines, Haar Cascade classifiers, and the like. Any suitable methods are contemplated. In some embodiments, bounding boxes may be fitted to identified objects in any manner, such as by drawing a rectangular box whose edges are both oriented parallel to the axes of the camera coordinate system, and are each tangent to an outer edge of the identified object. In some embodiments, bounding boxes may be fitted to identified objects by drawing a rectangular box whose vertical edges are oriented parallel to an axis of vehicle 301 whose orientation is determined by an orientation sensor of vehicle 301. Neural networks and bounding boxes are discussed in more detail in commonly owned application Ser. No. 17/384,510, filed Jul. 23, 2021, the entire contents of which is hereby incorporated by reference herein.

Machine learning model 306 may receive additional image data at a second time 315 (e.g., within a predefined period of time, such as, for example, a few seconds, of first time 313), and may output (at 314) indication 311 based on such input additional image data. The additional image data may comprise or correspond to images (including a second image) captured by one or more of image sensors 324, 328, 330 at second time 315 and may be associated with an environment surrounding vehicle 301, e.g., similar to the environment associated with the first image captured at first time 313, but at a future time than first time 313. Indication 311 may indicate that a probability that tracked object 310, or any other object, associated with the additional image data captured at second time 315, is present in the captured images in the environment surrounding vehicle 301 is below a certain predefined threshold (e.g., 0.4) and thus determine that no object is present in the surrounding environment of vehicle 301.

In some embodiments, a tracker portion 316, which may be implemented by processing circuitry 102 of vehicle 101 (and/or processing circuitry of server 136), may be used to composite or stitch together outputs from machine learning model 306 to track objects in the environment surrounding vehicle 301 over time. In some embodiments, tracker portion 316 may be used to check whether each output of machine learning model 306 may be a mis-detection (e.g., an object, such as tracked object 310 identified in the first image captured at first time 313, should have been present in the inputted additional image data captured at second time 315, but the output of machine learning model 306 does not indicate the presence of such object in the inputted additional image data) or false positive (e.g., the output of machine learning model 306 indicates the presence of an object in the inputted additional image data captured at second time 315, but the object should not have been present in the inputted additional image data). For example, tracker portion 316 may determine or otherwise receive information indicative of a first distance between vehicle 301 and detected object 310 at first time 313 (e.g., which may be determined based on output 308 and/or other image processing techniques, such as, for example, by determining a number of pixels between vehicle 301 and bounding box 312 associated with object 310), and tracker portion 316 may determine or otherwise receive information (e.g., from speed sensor 120) indicative of a speed of vehicle 301 at first time 313. While tracker portion 316 is described as receiving information from images (e.g., video frames) to track objects over time, it will be understood that tracker portion 316, as described herein, may also receive information from other sensor modalities to produce a fused tracked object list. For example, tracker portion 316 may also receive information from one or more of a radar sensor, a LiDAR senor, or an ultrasonic sensor. In some embodiments, tracker portion 316 is a first tracker and a separate second tracker is used for the other sensor modalities. The outputs of the first tracker (i.e., tracker portion 316) and the second tracker can then be combined to produce the fused tracked object list. Alternatively, the output of the first tracker (i.e., tracker portion 316) can be input to the second tracker (or vice-versa) to produce the fused tracked object list.

Tracker portion 316 may determine vehicle data, such as, for example, the determined speed of vehicle 301 (e.g., an absolute speed or a relative speed between vehicle 301 and object 310) and a location of vehicle 301 at time 313, and tracking data, e.g., a location of object 310 at time 313, and the determined distance between vehicle 301 and object 310 at first time 313. Based on such vehicle data and tracking data, a predicted location of object 310 at second time 315 associated with the additional image data may be determined. In some embodiments, multiple images captured at a plurality of times prior to first time 313 may be analyzed in determining the speed of vehicle 301 at time 313, locations of vehicle 301 and object 310, the first distance between vehicle 301 and object 310, and/or a speed of object 310 (e.g., by comparing multiple frames depicting object 310 within a predefined time period prior to a current time). For example, if at time 315, a distance between object 310 and vehicle 301 is determined to be 5 meters, and each of vehicle 301 and object 310 is determined to be traveling at roughly the same speed, tracker portion 316 may determine that output 314 of machine learning model 306 should have indicated the presence of tracked object 310 within a vicinity of vehicle 301 at a particular location. On the other hand, if at time 313 no objects were detected, but at time 315 an object is detected as adjacent to vehicle 301, tracker portion 316 may verify whether such object is likely to be a false positive (e.g., check to verify that the object identified at 315 includes features matching a known class of objects). At 320, tracker portion 316 may be configured to specify or draw an indication of region of interest (ROI) 318 corresponding to the location at which tracker portion 316 has determined that tracked object 310 should be located at second time 315 associated with output 314.

At 322, processing circuitry 102 may perform one or more remedial actions on the additional image data captured at second time 315, based on the determination of ROI 318 at time 315. The remedial action may be performed in order to ameliorate the potential mis-detection or false positive associated with output 314, by pulling in information from a previous frame (e.g., associated with time t) to a current frame (e.g., associated with time t+1) or a next frame. In some embodiments, the remedial action may comprise performing one or more traditional computer vision techniques to search for the mis-detected tracked object 310 in ROI 318. For example, computer vision convolution techniques may be employed, e.g., a kernel or filter or mask (e.g., any suitable number of pixels, e.g., 3×3 and convolved with a portion of the image) may be passed over portions of the image in performing edge detection (e.g., to identify vertical and horizontal edges) to detect a location of mis-detected tracked object 310. In some embodiments, the image may be converted to gray-scale to facilitate performing image processing thereon.

In some embodiments, in performing the remedial action on the additional image data captured at second time 315, features of the image within ROI 318 may be extracted (or such features may be acquired by tracker portion 316 based on preprocessing 304), and/or boundaries within ROI 318 may be identified (e.g., by identifying a change in pixel intensify or gradient between adjacent pixels exists above a predefined threshold) to identify a location of tracked object 310. In some embodiments, the extracted features within ROI 318 may be compared to features stored in a database (e.g., locally at vehicle 301 or at remote server 136) in association with corresponding object classes (e.g., car, motorcycle, truck, pedestrian) to detect the location of tracked object 310 within ROI 318 or at another portion of the image. For example, pattern matching as between the extracted features and features stored at server 136 may be performed. In some embodiments, mis-detected tracked object 310 may be identified based on color thresholding. In some embodiments, a hybrid approach comprising traditional computer vision techniques and deep learning and machine learning techniques may be employed.

In some embodiments, the remedial action may comprise feeding back the image associated with output 314 to machine learning model 306, together with an indication to temporarily lower a threshold confidence level of machine learning model 306 with respect to ROI 318 of such image. For example, if the threshold confidence level is generally 0.4 (e.g., an object identification associated with a confidence level lower than 0.4 is discarded), tracker portion 316 may instruct processing circuitry 102 of vehicle 101 to lower the confidence level to, e.g., 0.3, in connection with ROI 318 of the image being fed back to machine learning model 306. Thus, if the threshold confidence level were reduced to be 0.3, updated output 314 may indicate the presence of tracked object 310, and processing (e.g., autonomous navigation or notifications to an operator of vehicle 301) may be performed accordingly. In some embodiments, processing circuitry 102 may determine that the lower confidence level may be due to the occlusion of the object, and a lower threshold confidence level may be appropriate when a vehicle is expected to be occluded, e.g., if tracker 316 determines that on object has overtaken another object, and thus one of the objects is expected to be occluded in the captured image.

In some embodiments, the threshold confidence level may be dynamically adjusted at inference time, e.g., prior to, or when, machine learning model 306 is performing computations for predictions made at output 314, for any suitable number of subsequent frames in which tracked object 310 is expected to be present based on computations performed by tracker portion 316. In other words, on-the-fly inferences, e.g., to learn what a particular vehicle looks like that corresponds to a detected object, may be utilized in system 300 in performing the remedial action. It should be appreciated that, while FIG. 3 depicts output 314 from machine learning model 306 occurring prior to output 320 from tracker portion 316, it should be appreciated that the steps of FIG. 3 can occur in any suitable order (e.g., tracker 316 may determine ROI 318 prior to output 314 from machine learning model 306 being generated).

Figure 4:
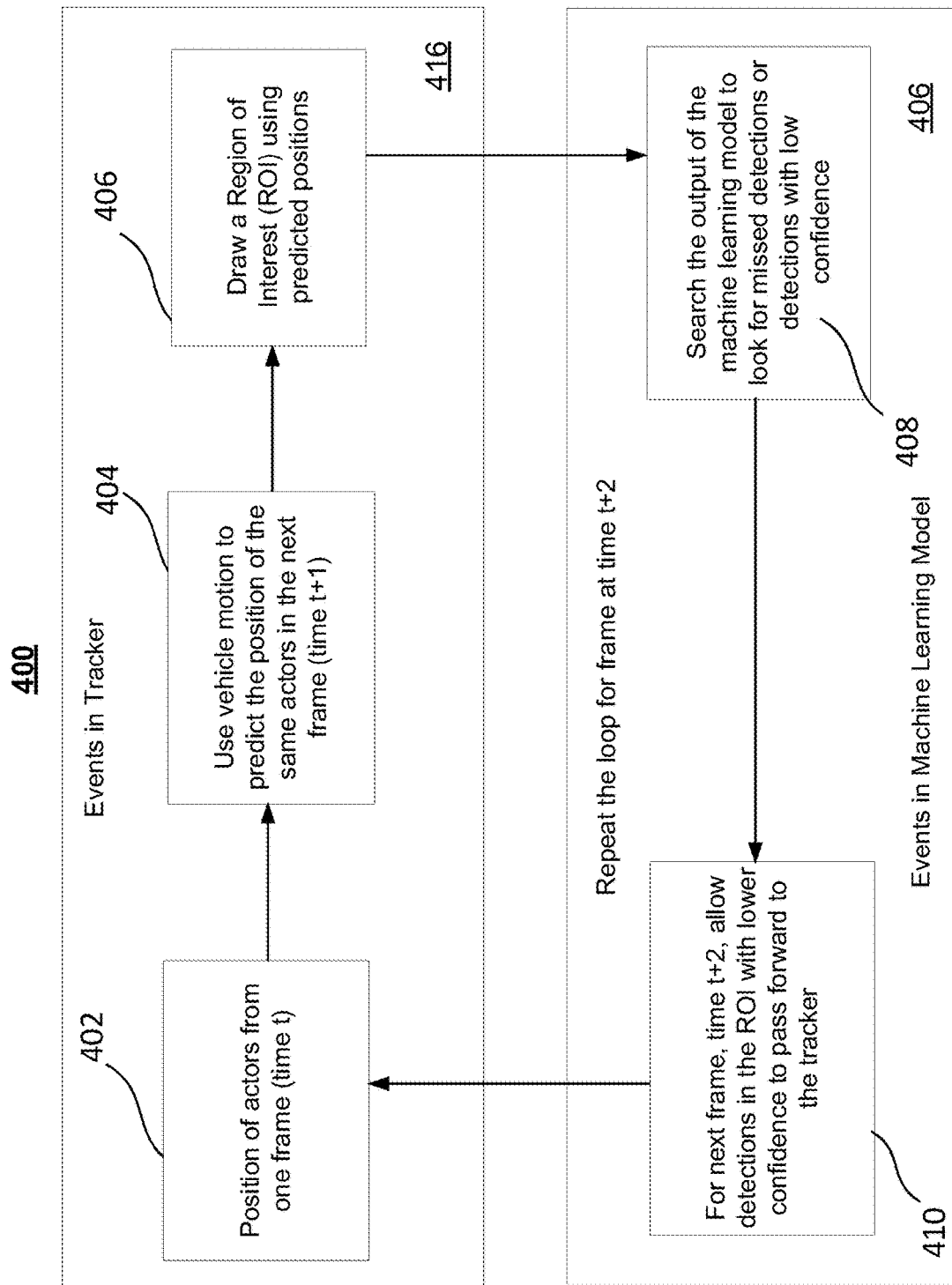
FIG. 4 shows a flowchart of illustrative process for performing a remedial action to identify an object in an image, in accordance with some embodiments of the present disclosure.

FIG. 4 shows a flowchart of illustrative process 400 for performing a remedial action to identify an object in an image, in accordance with some embodiments of the present disclosure. Process 400 may be executed at least in part by processing circuitry 102 of vehicle 101 and/or processing circuitry of server 136, which may implement machine learning model 406 and tracker portion 416 (which may respectively correspond to machine learning model 306 and tracker portion 316 of FIG. 3).

At 402, processing circuitry 102 may determine, based on an output of machine learning model 406, a position of one or more objects or actors at a particular time. For example, processing circuitry 102 may determine that an output of machine learning model 406 at a first time (time t indicated at 402) indicates the presences of multiple objects or actors in an environment surrounding vehicle 301, e.g., object 310 as well as one or more other additional objects (e.g., an additional vehicle, a pedestrian, etc.). Processing circuitry 102 may cause such determined positions of the objects (e.g., vehicle 301, object 310 and the additional object) to be received at tracker portion 416 from machine leaning model 406.

Processing circuitry 102 may, at 404, use a motion (e.g., a speed reading indicated by speed sensor 120) of vehicle 301 and a determined speed of vehicle 310 (and a distance therebetween) to predict the respective positions of vehicle 301 and object 310 in a frame subsequent to time t indicated at 402 (time t+1 indicated at 404), such as depicted at a second image not yet captured. In addition, processing circuitry 102 may, at 404, predict respective positions of vehicle 301 and each of the other one or more objects detected objects (e.g., the additional object) in the frame subsequent to time t+1 indicated at 404. This prediction may be based on the speed of vehicle 301 and such additional vehicle, and a distance therebetween. In some embodiments, a speed of object 310 and the additional object may be determined by tracker portion 416 based on a number of pixels separating vehicle 301 from object 310 and a number of pixels separating vehicle 301 and the additional object, respectively, in the image associated with time t indicated at 402, or using any other suitable technique.

At 406, processing circuitry 102 may use the positions predicted at 404 to draw a ROI 318 associated with object 310 and an additional ROI associated with the additional object, where each of ROI 318 and the additional ROI represent the predicted locations of object 310 and the additional object at future time t+1 indicated at 404. For example, based on a speed of vehicle 301 and a distance between vehicle 301 and object 310 at time t indicated at 402, processing circuitry 102 may predict that object 310 should be located at the location corresponding to ROI 318 at future time t+1 indicated at 404.

At 408, processing circuitry 102 may search the output of machine learning model 406 to identify missed detections or detections associated with a low confidence (e.g., below a predefined threshold confidence level). For example, one or more images corresponding to time t+1 indicated at 404 may be input to machine learning model 406, and machine learning model 406 may output an indication of whether one or more objects are present in the one of more input images, and if so, respective classes for each object and respective bounding boxes associated with a location for each object. At 408, processing circuitry 102 may determine that such output from machine learning model, associated with time 315, is associated with one or more relatively low confidence levels (e.g., 0.3 and 0.2, with respect to object 310 associated with ROI 318 and the additional object associated with the additional ROI, respectively), and otherwise is a candidate for a missed detection or false positive. That is, although object 310 and the additional object are present in the one or more input images corresponding to time t+1 indicated at 404, the output of machine learning model 406 may have failed to detect their presence with sufficient confidence, e.g., if such objects were occluded or only a small portion thereof was depicted in the input images. In some embodiments, the output of machine learning model 406 may be binary, to indicate either an object is detected in a particular region of interest or is not detected, and/or an argmax function may be utilized to obtain such binary decision.

At 410, processing circuitry 102 may determine a discrepancy between the ROIs identified at 406 associated with time t+1, and the output at 408 of machine learning model 406 indicating that images associated with time t+1 do not contain any objects (or contain more or less objects than the number of objects identified at 406). In response to determining the existence of such discrepancy, processing circuitry 102 may determine that there is a likelihood that one or more objects were mis-detected, and processing circuitry 102 may specify that, for the next one or more frames (e.g., associated time t+2 subsequent to time t+1 and time t), machine learning model 406 should allow detected objects in ROI 318 and the additional ROI to pass forward to tracker portion 316 even if a lower confidence level is associated with the one or more detected objects. For example, processing circuitry 102 may cause machine learning model 306 to lower a threshold confidence level (e.g., from 0.4 to a 0.3 or 0.2 probability or confidence score) associated with determining the presence of objects in input images, to enable a future output that may be associated with a confidence score of 0.3 to be indicative of the presence of one or more objects in the image, rather than discarding the image if the original threshold of 0.4 were to be utilized. In some embodiments, processing circuitry 102 may, additionally or alternatively to causing a confidence level to be lowered for machine learning model 306, perform traditional computer vision convolution techniques to identify the location of object 310 within ROI 318, and the location of the additional object within the additional ROI. Based on such one or more remedial actions, the threshold for determining whether object 310 and the additional object (and any other objects) are present in subsequent images associated with time t+2 and associated with suitable number of future times, may be reduced, and processing may be performed accordingly, e.g., by taking into account the location of object 310 during autonomous navigation.

Figure 5:
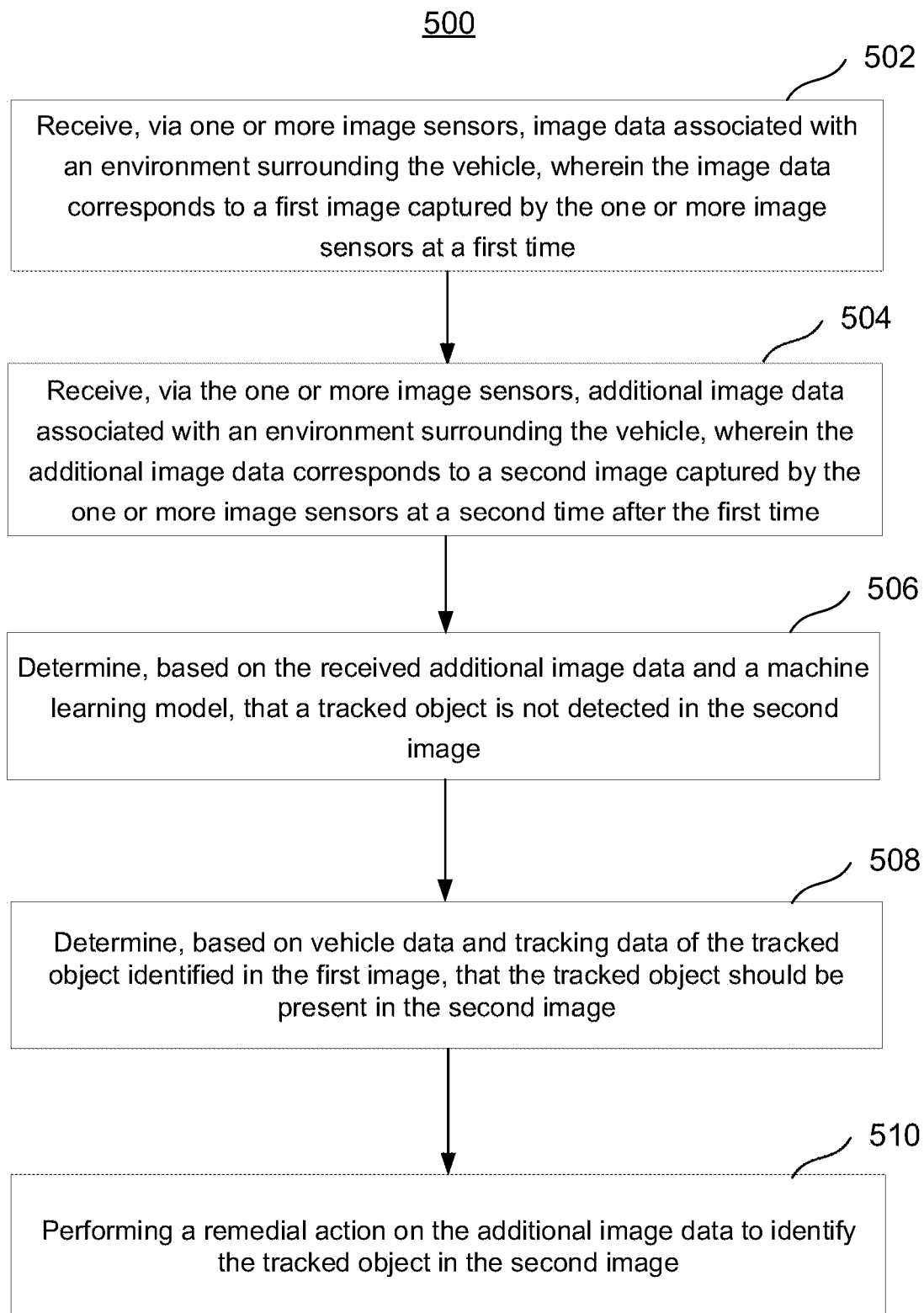
FIG. 5 shows a flowchart of illustrative process for performing a remedial action to identify an object in an image, in accordance with some embodiments of the present disclosure.

FIG. 5 shows a flowchart of illustrative process 500 for performing a remedial action to identify an object in an image, in accordance with some embodiments of the present disclosure. Process 500 may be executed at least in part by processing circuitry 102 of vehicle 101 and/or processing circuitry of server 136.

At 502, processing circuitry 102 of vehicle 101 may receive, via one or more image sensors 324, 328, 330, image data associated with an environment surrounding vehicle 301. Such image data may correspond to a first image captured by the one or more image sensors 324, 328, 330 at first time 313.

At 504, processing circuitry 102 of vehicle 101 may receive, via the one or more image sensors 324, 328, 330, image data associated with an environment surrounding vehicle 301. Such image data may correspond to a second image captured by the one or more image sensors 324, 328, 330 at second time 315.

At 506, processing circuitry 102 of vehicle 101 may determine, based on the additional image data, corresponding to the second image captured at second time 315, and based on a machine learning model 306, that a tracked object 310 is not detected in the second image. For example, tracked object 310 may be tracked in prior images or frames, captured prior to second time 315, such as at first time 313, but output 314 associated with the inputted additional image data captured at second time 315 may indicate that tracked object 310 is absent from the second image.

At 508, processing circuitry 102 of vehicle 101 may determine, based on vehicle data and tracking data of object 310, that tracked object 310 (identified in the first image captured at time 313) should be present in the second image captured at 302 and associated with second time 315. In some embodiments, tracker portion 316 may determine, based on a speed of vehicle 301 at time 313 and/or time 315, and based on a distance between tracked object 310 and vehicle 301, ROI 318 corresponding to a location at which tracked object 310 is predicted to be located. Such determination may be made even if output of machine learning model 306, associated with time 315, indicates a low probability (e.g., below a confidence threshold) of the presence of object 310. In some embodiments, 508 may be performed prior to 506, e.g., a prediction may be made of whether the tracked object should be present at second time 315, based on vehicle data and tracking data associated with time 313, prior to the additional image data associated with the environment surrounding vehicle 301 being captured at second time 315.

At 510, processing circuitry 102 of vehicle 101 may perform a remedial action on the additional image data to identify tracked object 310 in the second image associated with time 315. For example, processing circuitry 102 of vehicle 101 may utilize computer vision convolution techniques to identify a location of tracked object 310 within ROI 318. Additionally or alternatively, processing circuitry 102 of vehicle 101 may cause a threshold confidence level of machine learning model 306 to be lowered in association with ROI 318, e.g., to enable output 314 to qualify as a detected object, and be used in performing subsequent processing, e.g., in performing autonomous navigation. In some embodiments, the reduced threshold confidence level of machine learning model 306 may be applied to ROIs of one or more images input to machine learning model 306 subsequent to time 315.

Figure 6:
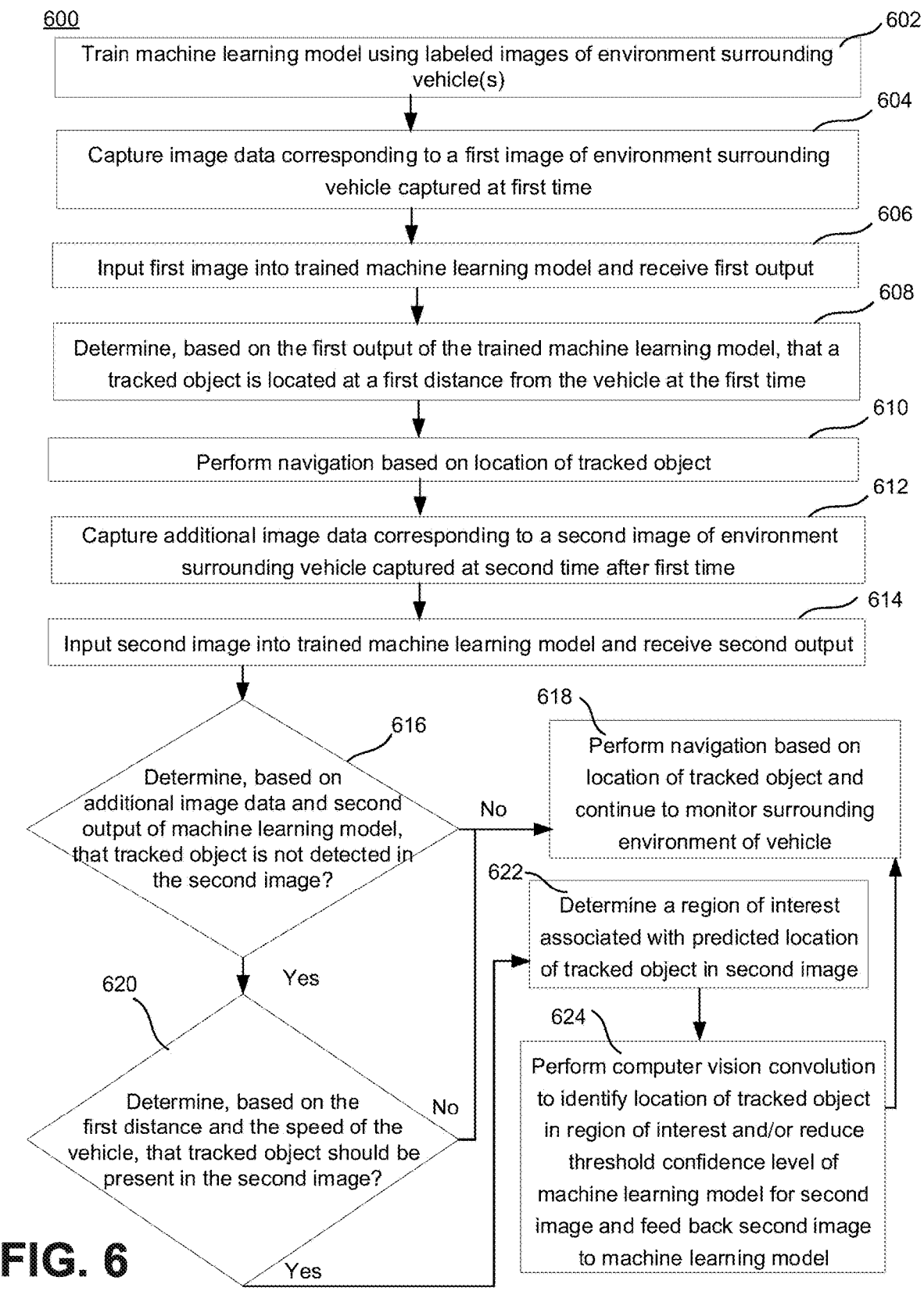
FIG. 6 shows a flowchart of illustrative process for performing a remedial action to identify an object in an image, in accordance with some embodiments of the present disclosure.

FIG. 6 shows a flowchart of illustrative process 600 for performing a remedial action to identify an object in an image, in accordance with some embodiments of the present disclosure. Process 600 may be executed at least in part by processing circuitry 102 of vehicle 101 and/or processing circuitry of server 136.

At 602, processing circuitry 102 of vehicle 101 and/or processing circuitry of server 136 may train machine learning model 206, using training data 202 comprising images of an environment surrounding a vehicle, where such training data may be annotated using labels of, e.g., whether an object is present in the training image, and if so, a class or type of object present in the image and an indication of parameters of a bounding box surrounding a perimeter of the object. In some embodiments, training machine learning model 206 may result in trained machine learning model 208, which may be, for example, a convolutional neural network.

At 604, image sensors 124, 126, 128 and/or 130 may capture image data corresponding to or comprising a first image of an environment surrounding vehicle 301 at a first time 313. For example, vehicle 301 may be stationary or navigating a roadway, e.g., highway, or traveling off-road.

At 606, the image data corresponding to or comprising the first image of the environment surrounding vehicle 301 at first time 313 may be input by processing circuitry 102 to trained machine learning model 208 (which may correspond to machine learning model 306), and processing circuitry 102 may receive a first output of machine learning model 306 based on inputting the image data to machine learning model 306. In some embodiments, preprocessing 304 may be performed on such images, e.g., to extract relevant features and/or perform any other suitable processing, prior to inputting the first image into machine learning model 306.

At 608, processing circuitry 102 may determine, based on the first output of the trained machine learning model, that a tracked object 310 is located at a first distance from vehicle 301 at first time 313. In some embodiments, output of the machine learning model may indicate a probability that an object is present in the inputted image data, parameters of a bounding box 312 surrounding a perimeter of the detected object, and an identification of a class of the object (e.g., car, pedestrian, truck, bicycle, etc.). At 610, processing circuitry 102 may perform navigation based on a location of tracked object 310. For example, processing circuitry 102 may cause vehicle 301, which may be in an autonomous driving mode, to change lanes in front of object 310, in response to determining that vehicle 301 is sufficiently far ahead of object 310 to execute such a maneuver.

At 612, image sensors 124, 126, 128 and/or 130 may capture additional image data corresponding to or comprising a second image of the environment surrounding vehicle 301 captured at second time 315 after first time 313. In some embodiments, second time 315 may occur immediately after first time 313. At 614, such additional image data corresponding to or comprising the second image may be inputted to trained machine learning model 306, and a second output may be received from machine learning model 306, indicating whether one or more objects are present in the second image, and/or bounding box parameters associated with the one or more objects and/or a type or class of the detected one or more objects.

At 616, processing circuitry 102 may determine, based on received additional image data and the second output of machine learning model 306, whether tracked object 310 is not detected in the second image. For example, if processing circuitry 102 determines that an output probability associated with a potential object in the second image is below a predefined confidence level threshold, processing may proceed to 620. In some embodiments, if an object is detected, processing may proceed to 618.

At 618, processing circuitry 102 may perform navigation based on a location of tracked object 310, as indicated in second output 314, e.g., indicating that a confidence level associated with the detected object 310 exceeds a predefined threshold. In some embodiments, processing at 618 may determine whether the output of machine learning model 306 is a false positive. For example, even if a probability associated with a detected object and output by machine learning model 306 exceeds a predefined threshold, processing circuitry 102 may perform one or more checks regarding whether such detected object corresponds to a false positive, e.g., no other images of a plurality of recently captured images depict the object, then processing may proceed to 620.

At 620, processing circuitry 102 may identify the first distance between vehicle 301 and tracked object 310 in the first image associated with time 313 and determined at 608, as output by machine learning model 306, and a speed of vehicle 301 (e.g., indicated by speed sensor 120). Processing circuitry 102 may determine, based on such determined first distance and the speed of the vehicle, whether the object should be present in the second image. If so, processing may proceed to 622. Otherwise, processing may proceed to 618. In some embodiments, determining the object should be present in the second image associated with second time 315 may comprise identifying or drawing ROI 318 associated with a predicted location of tracked object 310 in the second image.

At 622, processing circuitry 102 may determine ROI 318 associated with a predicted location of tracked object in second image. For example, processing circuitry 102 may determine that, based on a speed of one or more of vehicle 101 and tracked object 310 at time 313, and a distance between vehicle 101 and object 310 at time 313, tracked object 310 is projected to be located within ROI 318 at time 315.

At 624, processing circuitry 102 may perform computer vision convolution to identify a location of tracked object 310 in ROI 318 and/or reduce a threshold confidence level of machine learning model 306 for the second image (e.g., with respect to the portion of the image associated with ROI 318) and feed back such second image to machine learning model 306. For example, one or more edge or boundary detection techniques may be utilized to identify a location of tracked object 310. Additionally or alternatively, a threshold confidence level (e.g., 0.4) may be reduced (e.g., to 0.3), to enable output 314 to be considered as a valid detection of object 310, and thus enable output 314 to be utilized in performing processing at vehicle 301, e.g., in performing autonomous navigation and/or outputting a notification to occupants of vehicle 301.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
receiving, at a processor associated with a vehicle and via one or more image sensors associated with the vehicle, image data associated with an environment surrounding the vehicle, wherein the image data corresponds to a first image captured by the one or more image sensors at a first time;
receiving, at the processor and via the one or more image sensors, additional image data associated with an environment surrounding the vehicle, wherein the additional image data corresponds to a second image captured by the one or more image sensors at a second time after the first time;
determining, by the processor and based on the received additional image data and a machine learning model, that a tracked object identified in the first image is not detected in the second image;
determining, by the processor and based on vehicle data and tracking data of the tracked object, that the tracked object should be present in the second image; and
performing, by the processor, a remedial action on the additional image data to identify the tracked object in the second image.

2. The method of claim 1, wherein:
determining, based on the received additional image data and the machine learning model, that the tracked object identified in the first image is not detected in the second image comprises:
inputting the image data into the machine learning model, wherein the machine learning model outputs a first output based on the inputted image data;
inputting the additional image data into the machine learning model, wherein the machine learning model outputs a second output based on the inputted additional image data; and
determining, based on the second output of the machine learning model, that the second image does not comprise a depiction of the tracked object.

3. The method of claim 2, wherein:
the vehicle data comprises a speed of the vehicle;
the tracking data comprises a first distance between the tracked object and the vehicle at the first time; and
determining, by the processor and based on the vehicle data and the tracking data of the tracked object, that the tracked object should be present in the second image comprises:
determining, based on the first output of the machine learning model, that the tracked object is located at the first distance from the vehicle at the first time; and
determining, based on the first distance and the speed of the vehicle, that the second output should have indicated that the tracked object is depicted in the second image.

4. The method of claim 3, wherein:
the first output comprises a bounding box associated with a location of the tracked object in the first image; and
performing, by the processor, the remedial action on the additional image data to identify the tracked object in the second image comprises:
determining, based on the bounding box, the first distance, and the speed of the vehicle, a region of interest associated with a predicted location of the tracked object in the second image.

5. The method of claim 4, wherein performing the remedial action on the additional image data to identify the tracked object in the second image further comprises:
performing computer vision convolution within the region of interest to identify the tracked object in the second image; and
determining, based on the computer vision convolution, that the tracked object is located at a second distance from the vehicle at the second time.

6. The method of claim 4, wherein:
the machine learning model is associated with a threshold confidence level for identifying objects in image data inputted to the machine learning model; and
performing the remedial action on the additional image data to identify the tracked object in the second image further comprises:
reducing the threshold confidence level for a portion of the second image associated with the region of interest.

7. The method of claim 6, wherein performing the remedial action on the additional image data to identify the tracked object in the second image comprises:
feeding back the additional image data to the machine learning model associated with the reduced threshold confidence level for the portion of the second image associated with the region of interest; and
determining, based on a third output of the machine learning model received in response to feeding back the additional image data to the machine learning model, that the tracked object is located at a second distance from the vehicle at the second time.

8. The method of claim 1, wherein:
the vehicle is a first vehicle;
the environment surrounding the first vehicle is defined by a predetermined distance from the one or more image sensors of the first vehicle; and
the tracked object is a second vehicle within the predetermined distance.

9. A system comprising:
one or more image sensors associated with a vehicle; and
processing circuitry associated with the vehicle and configured to:
receive, via the one or more image sensors, image data associated with an environment surrounding the vehicle, wherein the image data corresponds to a first image captured by the one or more image sensors at a first time,
receive, via the one or more image sensors, additional image data associated with an environment surrounding the vehicle, wherein the additional image data corresponds to a second image captured by the one or more image sensors at a second time after the first time;
determine, based on the received additional image data and a machine learning model, that a tracked object identified in the first image is not detected in the second image;
determine, based on vehicle data and tracking data of the tracked object, that the tracked object should be present in the second image; and
perform a remedial action on the additional image data to identify the tracked object in the second image.

10. The system of claim 9, wherein:
the processing circuitry is configured to determine, based on the received additional image data and the machine learning model, that the tracked object identified in the first image is not detected in the second image by:
inputting the image data into the machine learning model, wherein the machine learning model outputs a first output based on the inputted image data;
inputting the additional image data into the machine learning model, wherein the machine learning model outputs a second output based on the inputted additional image data; and
determining, based on the second output of the machine learning model, that the second image does not comprise a depiction of the tracked object.

11. The system of claim 10, wherein:
the vehicle data comprises a speed of the vehicle;
the tracking data comprises a first distance between the tracked object and the vehicle at the first time; and
the processing circuitry is configured to determine, based on the vehicle data and the tracking data of the tracked object, that the tracked object should be present in the second image by:
determining, based on the first output of the machine learning model, that the tracked object is located at the first distance from the vehicle at the first time; and
determining, based on the first distance and the speed of the vehicle, that the second output should have indicated that the tracked object is depicted in the second image.

12. The system of claim 11, wherein:
the first output comprises a bounding box associated with a location of the tracked object in the first image; and
the processing circuitry is configured to perform the remedial action on the additional image data to identify the tracked object in the second image by:
determining, based on the bounding box, the first distance, and the speed of the vehicle, a region of interest associated with a predicted location of the tracked object in the second image.

13. The system of claim 12, wherein the processing circuitry is further configured to perform the remedial action on the additional image data to identify the tracked object in the second image by:
performing computer vision convolution within the region of interest to identify the tracked object in the second image; and
determining based on the computer vision convolution, that the tracked object is located at a second distance from the vehicle at the second time.

14. The system of claim 12, wherein:
the machine learning model is associated with a threshold confidence level for identifying objects in image data inputted to the machine learning model; and
the processing circuitry is configured to perform the remedial action on the additional image data to identify the tracked object in the second image by:
reducing the threshold confidence level for a portion of the second image associated with the region of interest.

15. The system of claim 14, wherein the processing circuitry is configured to perform the remedial action on the additional image data to identify the tracked object in the second image by:
- feeding back the additional image data to the machine learning model associated with the reduced threshold confidence level for the portion of the second image associated with the region of interest; and
- determining, based on a third output of the machine learning model received in response to feeding back the additional image data to the machine learning model, that the tracked object is located at a second distance from the vehicle at the second time.

16. The system of claim 9, wherein:
- the vehicle is a first vehicle;
- the environment surrounding the first vehicle is defined by a predetermined distance from the one or more image sensors of the first vehicle; and
- the tracked object is a second vehicle within the predetermined distance.

17. A non-transitory computer-readable medium having non-transitory computer-readable instructions encoded thereon that, when executed by a processor associated with a vehicle, causes the processor to:
- receive, via one or more image sensors associated with the vehicle, image data associated with an environment surrounding the vehicle, wherein the image data corresponds to a first image captured by the one or more image sensors at a first time;
- receive, via the one or more image sensors, additional image data associated with an environment surrounding the vehicle, wherein the additional image data corresponds to a second image captured by the one or more image sensors at a second time after the first time;
- determine, based on the received additional image data of and a machine learning model, that a tracked object identified in the first image is not detected in the second image;
- determine, based on vehicle data and tracking data of the tracked object, that the tracked object should be present in the second image; and
- perform a remedial action on the additional image data to identify the tracked object in the second image.

18. The non-transitory computer-readable medium of claim 17, wherein:
- the execution of the instructions to determine, based on the additional image data and the machine learning model, that the tracked object is not detected in the image further causes the processor to:
  - input the image data into the machine learning model, wherein the machine learning model outputs a first output based on the inputted image data;
  - input additional image data into the machine learning model, wherein the machine learning model outputs a second output based on the inputted additional image data; and
  - determine, based on the second output of the machine learning model, that the second image does not comprise a depiction of the tracked object.

19. The non-transitory computer-readable medium of claim 18, wherein:
- the vehicle data comprises a speed of the vehicle;
- the tracking data comprises a first distance between the tracked object and the vehicle at the first time; and
- determining, based on the vehicle data and the tracking data of the tracked object, that the tracked object should be present in the image comprises determining, based on the first distance and the speed of the vehicle, that the second output should have indicated that the tracked object is depicted in the second image.

20. The non-transitory computer-readable medium of claim 19, wherein:
- the first output comprises a bounding box associated with a location of the tracked object in the first image; and
- the execution of the instructions to perform the remedial action on the additional image data to identify the tracked object in the second image further causes the processor to:
  - determine, based on the bounding box, the first distance, and the speed of the vehicle, a region of interest associated with a predicted location of the tracked object in the second image.

* * * * *